United States Patent [19]

Loy

[11] 3,992,107
[45] Nov. 16, 1976

[54] AUTOMATIC FLAT WIDTH CONTROL
[75] Inventor: Larry H. Loy, Cartersville, Ga.
[73] Assignee: Union Carbide Corporation, New York, N.Y.
[22] Filed: Aug. 27, 1975
[21] Appl. No.: 608,293

[52] U.S. Cl................................. 356/160; 250/560; 356/167
[51] Int. Cl.².................... G01B 11/04; G01B 11/02
[58] Field of Search................... 356/159, 160, 167; 250/223 B, 224, 560, 570

[56] References Cited
UNITED STATES PATENTS

| | | | |
|---|---|---|---|
| 3,365,699 | 1/1968 | Foster | 356/167 |
| 3,549,890 | 12/1970 | Keller | 250/223 B |

*Primary Examiner*—John K. Corbin
*Assistant Examiner*—Wm. H. Punter
*Attorney, Agent, or Firm*—Maurice W. Ryan

[57] ABSTRACT

The width of a continuously moving flat material, such as a web, or a film sheet, or a flattened tubular plastic film, in manufacture or in process, is continuously monitored by non contacting sensor means which scan the material by oscillating transversely across its moving edges. Departures from a preselected desired width are detected and signals are developed corresponding to the magnitude of a departure, and to whether it constitutes an increase or a decrease from the preselected width. The signals thus developed may be translated into visual or other sensible indicia and may also be applied to make appropriate changes in process control to reattain the set point width of the material being monitored.

14 Claims, 3 Drawing Figures

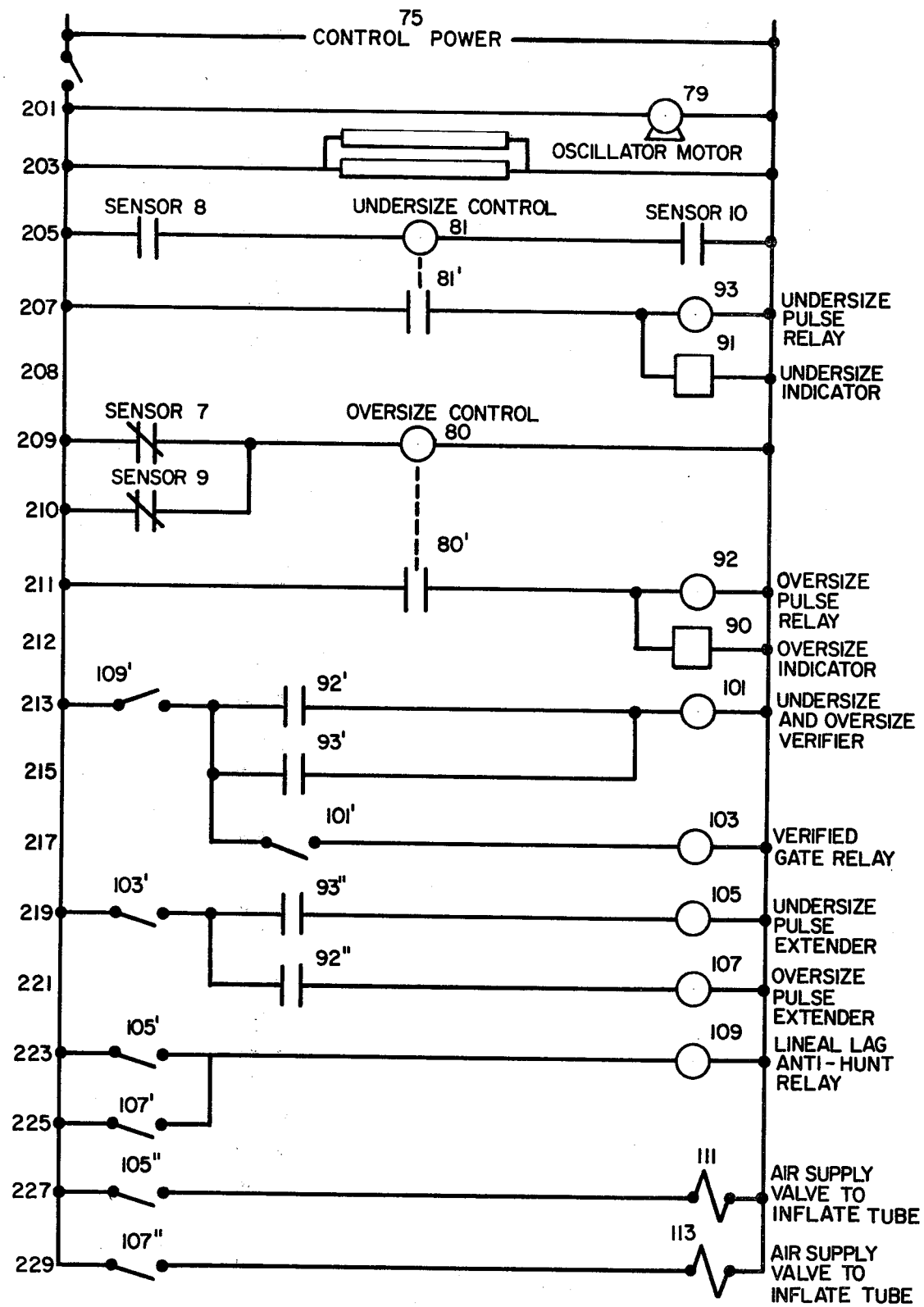

AUTOMATIC FLAT WIDTH CONTROL

This invention relates to the detection and measurement of aberations in the width of a continuously moving flat web of material, in process, usually for the purpose of monitoring and controlling the width by sensing variations from a preselected norm, developing correction signals representative of the sensed variations from the preselected norm, and applying these signals to a width control function somewhere up line in the production process.

Film and tape width controllers are not unknown in industry. Illustrative of this art is, for example, U.S. Pat. No. 3,153,501 to Hearns, which comprehends a pair of air streams directed closely adjacent the edges of a continuously moving web and impinging on and holding open switch means. If either of the air streams is interupted by an aberation in the film width, the switch closes and a signal is developed and directed appropriately to correct the aberation.

In the manufacture of plastic film bags, sleeves and sheets for the packaging industry, a thermoplastic material is extruded at a temperature higher than its softening point, blown up with air to form a bubble, cooled to a temperature below the setting point of the thermoplastic, squeezed between rollers to remove the air, and taken off as flattened tubing which can be nicely reeled up for further processing or otherwise used in production. The flat width of such tubing, it can be readily appreciated from the foregoing, is determined by the perimetry of the blown bubble which is, in turn, determined by the air volume within the bubble. Thus it may be considered that if the air volume within the bubble can be made a function of the flat width of the film tubing, as determined somewhere in the process down line of the flattening step, an automatic closed loop feedback control of the process may be attained.

Efforts towards this end have, to date, been less than completely successful, due in most part to the difficulties encountered in continuously monitoring flattened film edges moving at high speeds. If film contacting sensor devices are used, there is encountered the risk of damaging the flattened tubing by tearing, scraping, or the like, with consequent shut down and loss of production time and materials. When, on the other hand, prior to the time of the present invention, non-contacting scanning means or sensors were used, system response times were randomly too fast or too slow, causing hunting of the control apparatus or spurious error signals might be picked up from some cause other than a film width aberation.

The problem prior to the time of the present invention, then, was that no system was available for the closed loop feedback automatic control of the flat width of blown tubular plastic films, which would provide for non-contact, non-destructive film scanning, response times within the required limits, elimination of control system hunting, and, generally, consistent reliability and reproduceability of results.

With this, then, being the state of the art, the present invention was conceived and developed to provide a means to measure the departures from a preselected width in the width of a continuously moving web of material.

The invention further provides a technique for continuously monitoring the width of a continuously moving web of material and producing error signals representative of and proportional to aberations in width in either undersize or oversize directions.

Still further, and more particularly, the invention provides a closed loop feedback control system for maintaining a preselected desired flat width of blown tubular plastic film by varying the air volume within the blown tubing according to sensor developed signals representing departures from the preselected desired width.

These and other features and advantages of the invention will be the more fully understood and appreciated from the ensuing detailed description and in the light of the drawings wherein;

FIG. 1 is a schematic representation of the overall system and apparatus components of the invention, FIG. 2 is a time-signal diagram showing the relationship between and the duration times of various signals developed in accordance with the practice of the invention, and FIG. 3 is an electrical control schematic diagram for an apparatus embodiment according to the invention.

In general, the present invention comprehends the non-contact detection and measurement of a departure from a preselected width in the width of a continuously moving web of material by performing the steps of generating a first pair of web detection fields spaced apart a distance less than the preselected width and disposed at transversely opposite locations adjacent the loci of the moving web edges; generating a second pair of web detection fields, aligned, substantially linearly with said first pair of web detector fields disposed at transversely opposite locations adjacent the loci of the moving web edges, spaced apart a distance greater than the preselected width; continuously moving said pairs of web detection fields, together, reciprocally, transversely across the edges of the continuously moving web; developing a first signal corresponding to the absence of web material from both of the first pair of detection fields; developing a second signal corresponding to the presence of web material in both of the second pair of detection fields; translating said first signal into indicia representative of and proportional to a departure from the preselected width to a width less than the preselected width; and translating said second signal into indicia representative of and proportional to a departure from the preselected width to a width greater than the preselected width.

A typical apparatus embodiment according to the present invention comprises, in combination, a first pair of web detector means spaced apart a distance less than the preselected width and disposed at transversely opposite locations adjacent the loci of the moving web edges; a second pair of web detector means spaced apart a distance greater than the preselected width, disposed in substantially linear alignment with said first pair of web detector means at transversely opposite locations adjacent the loci of the moving web edges; a support means mounting at least sensor portions of the first pair and the second pair of web detector means, disposed and arranged transversely athwart the direction of web movement; motive means to oscillate the support means and the portions of the first and the second pairs of web detector means mounted thereon reciprocally transversely across the edges of the continuously moving web; first signal generating means operably connected to the first pair of web detector means to produce a signal upon non detection of web material simultaneously in both of said first pair of web detection means; second signal generating means operably connected to the second pair of web detector means to produce a signal upon the detection of web material simultaneously in both of said second pair of web detection means; means to translate a signal from said first signal generating means into indicia representative of and proportional to a departure from the preselected width to a width less than the preselected width; and means to translate a signal from said second signal generating means into indicia representative of and proportional to a departure from the preselected width to a width greater than the preselected width.

In practicing the invention it has been found advantageous to use light sensitive detector means in combination with light emission sources to perform the web edge scanning function and to utilize electrical circuitry to whatever extent possible in the signal generating, translating, and control components.

In a particular working embodiment of the invention, the correction signals developed are electrical pulse form signals and are applied, through verification and time delay circuits, to control pneumatic values in air supply and discharge lines to the blown bubble of a plastic film tubing in manufacture.

With the automatic flat width control apparatus of this invention, the flat width of a continuously moving flat web of material is compared to a fixed dimension representative of a preselected reference flat width. When a width change either above or below predetermined outsize tolerances occurs, an error signal is generated and translated to indicate whether the error is an oversize or an undersize and, after verification involving the occurrrence of a preselected number of pulses in the course of an appropriate calculated time delay, applied to activate control means towards error correction.

Succinctly stated, the invention comprehends the use of two oscillating pairs of photocell sensors to continuously monitor the moving web edges, and thus detect whether the web, flattened tubular film as herein described for instance, is within or outside of width tolerances. The amplitude of oscillation of the sensors is sufficient to include the maximum distance laterally across which the moving web is likely to wander. When the film is too narrow, the inboard sensors will receive light emission simultaneously, and when the film is too wide, the outboard sensors will both be covered and thus blocked from light emission simultaneously. Sensor devices other than photocells may be used, it being important primarily that they be non detrimental to the film. Alternate forms of sensors adaptable to use in the invention may be, for example, energy radiation sources of various type, sound waves, pneumatic fields, and other forms as will occur to persons familiar with the art, not excluding such physical contact devices as may be safely used and are as yet to be developed.

DETAILED DESCRIPTION

The invention will now be described with greater particularity and with reference to the drawings.

Figure 1:
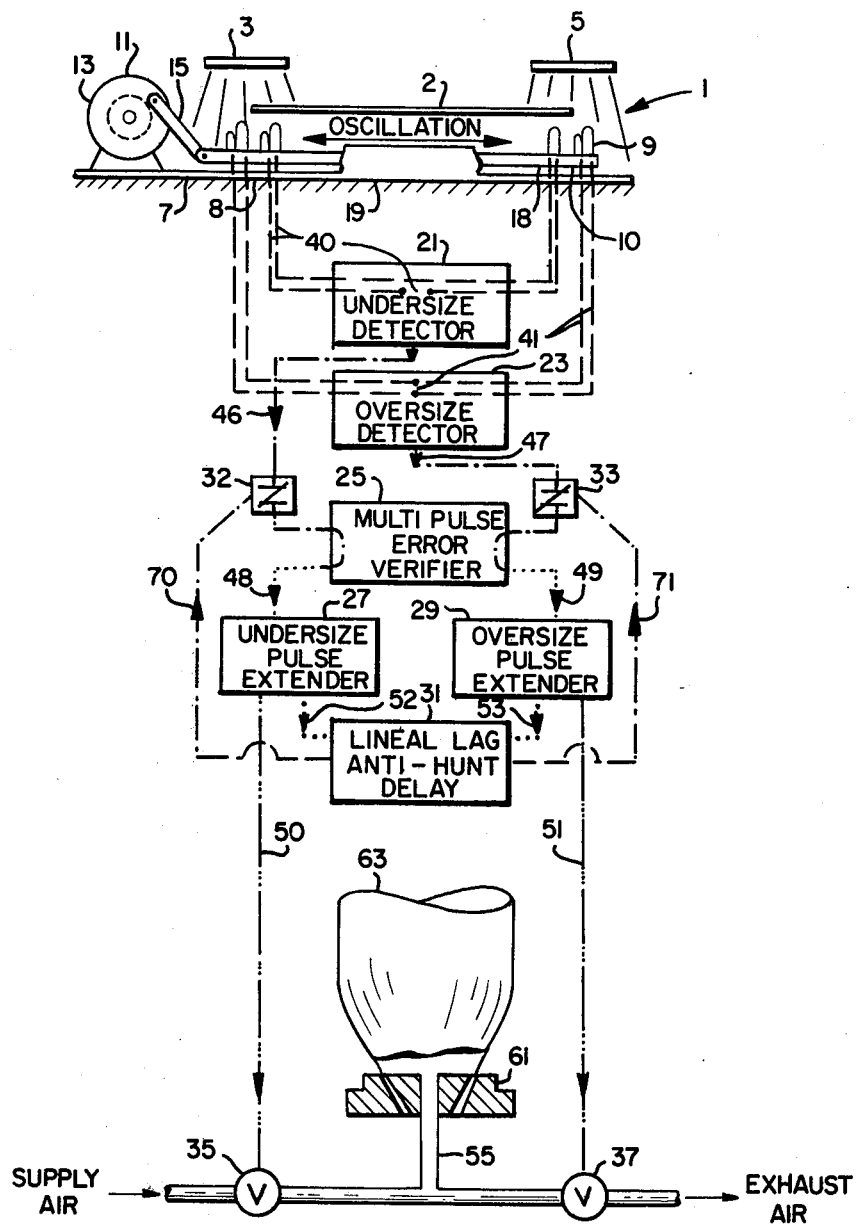

FIG. 1 shows an apparatus embodiment according to the present invention including a sensing combination shown generally at 1, in place on a moving web film 2 which is depicted sectionally. The sensing combination 1 includes four photocells, 7, 8, 9, 10 with a first pair 8, 10, arrayed inboard the film 2 edges and a second pair 7, 9 arrayed outboard the film 2 edges. Light sources 3, 5 are provided and fixedly mounted juxtaposed to the photocells so that light emitted from light source 3 will impinge on the photocells 7, 8 if unobstructed, and light from light source 5 will, if unobstructed, impinge on the photocells 9, 10.

The photocells are fixedly mounted on a common support bar 18, at spacings such that the distance from the midpoint between the left side photocells 7, 8 to the midpoint between the right side photocells 9, 10 is equal to the flat width sought to be maintained. Support bar 18 is movably mounted on a base 19 so as to be free to move reciprocally back and forth athwart the film 2 width a distance sufficient to permit the inboard and outboard photocell pairs to traverse the film edges during each oscillation. One end of support bar 18 connects to a crankarm driving plate 13 mounted on the shaft of a drive motor 11 to provide for the required translation of rotational to reciprocal driving motion.

The signal outputs of the inboard pair of photocells 8, 10 are series connected and connect with photocell amplifier undersize control 21 through circuit 40. The signal outputs of the outboard pair of photocells 7, 9 are parallel connected and connect with photocell amplifier oversize control 23 through circuit 41.

A circuit 46 is provided between the output of undersize control 21 and a signal verifier 25 and a circuit 47 is provided between the output of oversize control 23 and the signal verifier 25. Remotely operable disconnect means 32, 33, the functions of which will be hereinafter described, are provided respectively in the circuits 46 and 47.

From the signal verifier 25, a circuit 48 is provided to an undersize signal translator 27 and a circuit 49 is provided from signal verifier 25 to an oversize signal translator 29.

Undersize signal translator 27 connects to a supply air control valve 35 and oversize signal translator 29 connects to an exhaust air control valve 37 which manifolds into a main air line 55 which provides inflation air to the inflated tubing 63 through a passage in the extruder die 61 as shown. The signal translators 27, 29 also connect through circuits 52, 53 to a time delay circuit 31 which in turn connects back to the remotely operable disconnect means 32, 33 respectively through circuits 70, 71.

Figure 2:
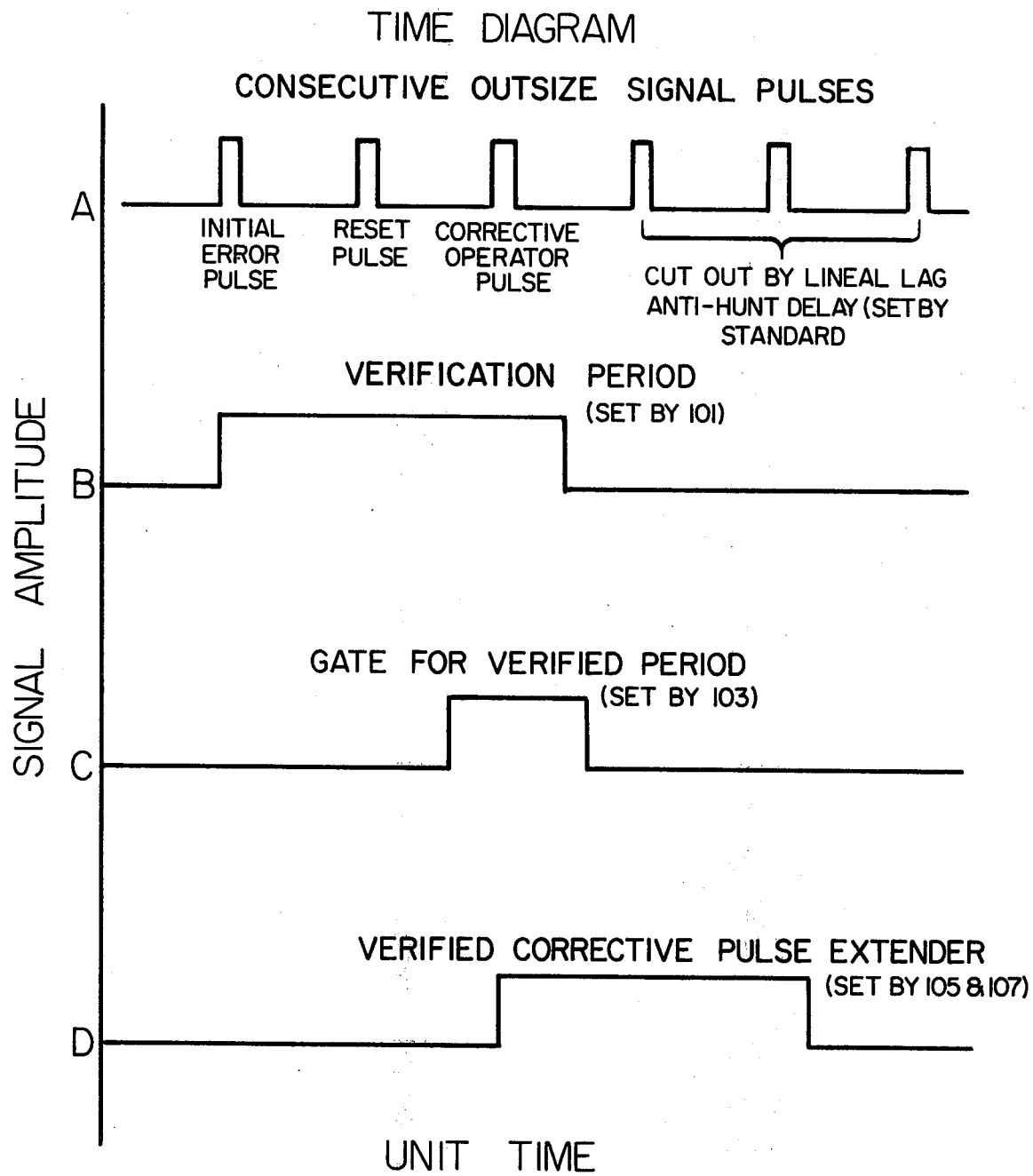

Reference to the foregoing description as illustrated by FIG. 1 of the drawings as well as reference to FIGS. 2 and 3 of the drawings, will be helpful in understanding the ensuing description of the operation of the invention.

As the film 2 travels in a direction away from the viewer in FIG. 1, motor 11 drives the support bar 18 reciprocally through crankarm driving plate 13 and the crankarm 15, oscillating the pairs of photocells to and fro beneath the film edges. The amplitude of the oscillation must be sufficient to pass the photocell pairs completely beneath and then completely clear of the edges of the film at the extreme positions of lateral displacement or drift which the running film 2 may reach at any time in normal operation. The spacing between the photocell pairs 7, 8 and 9, 10 is, as has been noted hereinabove, set to equal the width to be maintained in operation.

As the photocells oscillate beneath a correct width of film at the start of a left to right traverse, both cells 7 and 8 are exposed to light from light source 3 and both cells 9 and 10 are blocked from light emitting from light source 5 by the right edge of the film. As the traverse proceeds from left to right, photocell 9 emerges into light simultaneously as photocell 8 passes out of the light under the left edge of the film. At the completion of the traverse, photocell 10 will have followed photocell 9 out into the light at the right edge, and photocell 7 will have followed photocell 8 under the left edge of the film, leaving the right edge cell pair 9, 10 now exposed to light from light source 5 and both the cells 7 and 8 blocked from light emitting from light source 3 by the left edge of the film. The sequence reverses on the subsequent traverse from right to left.

FIG. 3 of the drawings shows the inboard photocells 8, 10, are series connected with a power source and with a coil in a relay 81 comprised in undersize detector 21. The relay 81 contactor 81' is normally open, that is to say open when its coil is deenergized. With the connection shown, and with normal film width constantly maintained, one or the other of the photocells 8, 10 will always be lightblocked by a film edge, the coil of relay 81 will remain deenergized, and relay contactor 81' will remain open. On the occurrence of a film width below normal, however, light will impinge on both photocells 8 and 10 causing simultaneous photocell contact closure, energization of the relay 81 coil, and closure of the relay 81 contactor 81'.

The outboard photocells 7, 9 are parallel connected between a power source and a coil in a relay 80 comprised in oversize detector 23. The relay 80 contactor 80' is normally closed, that is to say closed when its coil is deenergized. With the connection shown, and with normal film width constantly maintained, one or the other of the photocells 7, 9 will always be light impinged while the other may be wholly or partly light blocked. The maintained closure of at least one of the photocells 7, 9 contacts, keeps the coil in relay 80 energized, and relay contactor 80' open. On the occurrence of a film width greater than normal, however, light will be blocked from both photocells 7 and 9, causing simultaneous, photocell contact opening, deenergization of the relay 80 coil, and closure of the relay 80 contactor 80'.

When an undersize or an oversize occurrence effects closure of relay contactor 81', line 207, FIG. 3, or relay contactor 80 line 209, FIG. 3, the coil of pulse relay 93 or of pulse relay 92 will be connected across control power, energized, and cause closure of one or the other of pulse relay contactors 92', 93' lines 213, 215, FIG. 3. This action in turn will energize the relay 101 coil which pulls contact 101' on line 217, FIG. 3 into a timed closure, energizing the coil of relay 103 and pulling closed contact 103' in line 219. The time of closure of contact 101' is used as a verification period to insure that what was detected as an error signal will be sufficiently persistent to warrant corrective action, and is achieved by retarding the automatic opening of contact 101 after the relay 101 coil is deenergized.

With reference to lines A and B of the time diagram of FIG. 2 of the drawings, this time delay or verification period set by relay 101 is of sufficient duration to permit the occurrence of an additional error signal pulse after the first pulse from whichever pulse relay has been actuated. If the second pulse does not occur, relay 101 remains deenergized long enough to permit its timed contact 101' to reopen, thus deenergizing the relay 103 coil and allowing its contactor 103' to reopen. When a second error signal pulse does occur, the verification period continues and permits the next occuring or third error signal pulse in the sequence to pass to a pulse extender or signal translator relay coil 105 or 107 through either contact 93'' or contact 92'' at lines 219, 221 of FIG. 3. The contacts 93'' and 92'' are closed respectively upon the energization of the relay 93 and relay 92 coils, as described hereinabove.

According to whether an undersize error signal pulse is gated or translated through closed contact 93'' to relay 105 coil on line 219 or an oversize error signal pulse is gated or translated through closed contact 92'' to relay 107 coil on line 221, the relay 105 contacts 105' and 105'' or the relay 107 contacts 107' and 107'' will pull closed. An undersize signal will thus effect energization of the coil of relay 111 in line 227, FIG. 3, which operates the supply air control valve 35 while an oversize signal will effect energization of the coil of relay 113 in line 229, FIG. 3, which operates the exhaust air control valve 37.

Actuation of either the undersize or oversize pulse extender or signal translator relays 105, 107 will, as noted above, effect closure of one of the relay contacts 105', 107', lines 223, 225, FIG. 3, which will in turn energize the coil of relay 109 in the antihunting circuitry, causing contact 109' at line 213 to open and disable the 92', 93' contact array for a preselected time sufficient to permit the correction signal to have discernable effect on the monitored width of the web or flattened tubing.

The foregoing description will enable persons familiar with the art not only to understand the invention but to practice it with the application of commercially available apparatus components assembled according to the inventive combination.

In a typical installation, the invention is successfully used in a plastic bag manufacturing process in monitoring a flat width of 74 inches of a flattened blown polyethylene tubing of 1.5 mil wall thickness traveling to a take up reel at a linear speed of 200 feet per minute. The permissible variation from the nominal 74 inch width is ± ⅜ inch in accordance with established production standards. A 110 volt control system is used. Commercially available photo resistor elements are used as the photocells and 24 inch long fluorescent lamps mounted about 18 inches above the photo resistors are used as the light sources. Standard commercially available industrial control relay components are connected according to the invention. Each edge pair of photo resistors is mounted on ⅜ inch centers and the centerline distance between the edge pairs of the photo resistors is 74 inches. The photo resistors are oscillated at a frequency of 5 cycles per minute through a 4 inch oscillation amplitude. Depending on the nature and magnitude of an error signal, air is either added to or removed from the blown extruded tubing bubble through a combination of valves and a venturi connected to exhaust air from the bubble upon main air passage therethrough.

Various alternate modes, refinements and improvements may be used in the practice of the invention. For instance a smoother oscillatory motion of the sensor elements and thus a more even velocity of their movements is attained when the support bar 18 mounting the sensor elements is cam actuated rather than driven by the crankarm and crankarm plate arrangement hereinabove described. It is also possible to use arrangements and combinations of light operated and/or dark operated photo sensitive elements other than those hereinabove described without departing from the spirit of the invention, as will be within the knowledge of persons familiar with the art.

From the foregoing description it can be that the invention constitutes a significant advance in the art and provides for the first time as monitoring technique wherein no adjustment or compensation is required to account for random lateral movement of a moving flat width being monitored, this problem being obviated by the oscillating scanning feature utilized. According to this feature the monitored parameter and the monitoring means made be said, in a sense, to float and interrelate independently of any outside fixed reference.

Numerous other alternative modes and apparatus embodiments within the spirit of the invention will, in the light of this disclosure, undoubtedly, occur of persons conversant with the art. It is therefore intended that the foregoing description be considered as illustrative only and not construed in any limiting sense.

What is claimed is:

1. Apparatus for the detection and measurement of a departure from a preselected width in the width of a continuously moving web of material comprising, in combination,
    a first pair of web detector means spaced apart a distance less than the preselected width and disposed at transversely opposite locations adjacent the loci of the moving web edges;
    a second pair of web detector means spaced apart a distance greater than the preselected width, disposed in substantially linear alignment with said first pair of web detector means at transversely opposite locations adjacent the loci of the moving web edges;
    a support means mounting at least sensor portions of the first pair and the second pair of web detector means, disposed and arranged transversely athwart the direction of web movement;
    motive means to oscillate the support means and the portions of the first and the second pairs of web detector means mounted thereon reciprocally transversely across the edges of the continuously moving web,
    first signal generating means operably connected to the first pair of web detector means to produce a signal upon non-detection of web material simultaneously in both of said first pair of web detection means,
    second signal generating means operably connected to the second pair of web detector means to produce a signal upon the detection of web material simultaneously in both of said second pair of web detection means,
    means to translate a signal from said first signal generating means into indicia representative of and proportional to a departure from the preselected width to a width less than the preselected width, and
    means to translate a signal from said second signal generating means into indicia representative of and proportional to a departure from the preselected width to a width greater than the preselected width.

2. Apparatus according to claim 1 wherein the web detector means comprise energy emission means in combination with corresponding respective energy sensor means.

3. Apparatus according to claim 2 wherein the energy emission means are light sources and the energy sensor means are photovoltaic elements.

4. Apparatus according to claim 1 wherein said first and said second signal generating and said signal translating means are electrical means.

5. Apparatus according to claim 2 wherein said first and said second signal generating means and said signal translating means are electrical means.

6. Apparatus according to claim 3 wherein said first and said second signal generating means and said signal translating means are electrical means.

7. Apparatus according to claim 1 in combination with web width control means operably connected to the first and the second signal generating means.

8. Apparatus for the detection, measurement and reversal of a departure from a preselected width in the width of a continuously moving web of material comprising, in combination,
    a first pair of photovoltaic cells spaced apart a distance less than the preselected width, disposed at transversely opposite locations adjacent the loci of moving web edges, in circuit in series connection with a first signal generating means;
    a second pair of photovoltaic cells spaced apart a distance greater than the preselected width, disposed in substantially linear alignment with said first pair of photovoltaic cells at transversely opposite locations adjacent the loci of the moving web edges, in parallel connection between themselves, in circuit with a second signal generating means;
    an elongate rigid support mounting said pairs of photovoltaic cells, arranged and disposed transversely athwart the direction of web movement;
    fixed light emission sources juxtaposed the photovoltaic cells arranged to impinge light thereon and spaced therefrom a distance to permit clear passage of a web material edges between said light emission sources and respective photovoltaic cells;
    oscillatory motive means operably connected to said support adapted to reciprocally move said support and the photovoltaic cells mounted thereon transversely back and forth across the edges of the continuously moving web;
    first signal generating means in circuit with the first pair of photovoltaic cells adapted to produce a pulse signal upon non-detection of web material simultaneously between both of said first pair of photovoltaic cells and their respective light emission sources;
    second signal generating means in circuit with the first pair of photovoltaic cells adapted to produce a pulse signal upon the detection of web material simultaneously between both of said second pair of photovoltaic cells and their respective light emission sources;
    web width control means in circuit with said first and said second signal generating means;
    a first signal translator in circuit with said first signal generating means and said web width control means adapted to apply an undersized web control correction signal to the web width control means proportional to a pulse signal produced in said first signal generating means;
    a second signal translator in circuit with said second signal generating means and said web width control means adapted to apply an oversized web control correction signal to the web width control means proportional to a pulse signal produced in said second signal generating means;

a pulse signal verifier in circuit with said first and said second signal generating means and said first and said second signal translators adapted to receive a preselected number of pulse signals from a signal generating means before transmitting a first pulse signal to a translator;

disconnect means in circuit with said signal generating means, said signal translators, and said pulse signal verifier energized and operable by the translators to disconnect the signal generators each from their respective signal translators while a respective correction signal is applied to the web width control means, and signal anti hunting time delay circuiting in circuit with the translators and the web width 9. A method for the non-contact detection and measurement of a departure from a preselected width in the width of a continuously moving web of material, which method comprises the steps of generating a first pair of web detection fields spaced apart a distance less than the preselected width and disposed at transversely opposite locations adjacent the loci of the moving web edges;

generating a second pair of web detection fields, aligned, substantially linearly with said first pair of web detector fields disposed at transversely opposite locations adjacent the loci of the moving web edges, spaced apart a distance greater than the preselected width;

continuously moving said pairs of web detection fields, together, reciprocally, transversely across the edges of the continuously moving web;

developing a first signal corresponding to the absence of web material from both of the first pair of detection fields;

developing a second signal corresponding to the presence of web material in both of the second pair of detection fields;

translating said first signal into indicia representative of and proportional to a departure from the preselected width to a width less than the preselected width; and translating said second signal into indicia representative of and proportional to a departure from the preselected width to a width greater than the preselected width.

10. A method according to claim 9 in which the web detection fields generated are light fields.

11. A method according to claim 9 in which the first and the second signals are developed and translated electrically.

12. A method according to claim 10 in which the first and the second signals are developed and translated electrically.

13. A method according to claim 9 in combination with the added step of applying the first and the second signals developed to a control function determinative of the width of the web of material.

14. A method according to claim 9 wherein the continously moving web of material is a flattened blown tubular plastic film and the first and second signals which are developed are applied to control air volume interior of the blown tubular plastic film while it is in a softened condition.

* * * * *